(12) United States Patent
Murakami (10) Patent No.: US 7,532,353 B2
(45) Date of Patent: May 12, 2009

(54) IMAGE FORMING SYSTEM WITH SCANNER CAPABLE OF CHANGING MAGNIFICATION OF SCANNED IMAGE

(75) Inventor: Naoya Murakami, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 807 days.

(21) Appl. No.: 10/935,227

(22) Filed: Sep. 8, 2004

(65) Prior Publication Data

US 2005/0030591 A1 Feb. 10, 2005

Related U.S. Application Data

(63) Continuation of application No. 09/668,345, filed on Sep. 25, 2000, now Pat. No. 6,909,521.

(51) Int. Cl.
G06F 15/00 (2006.01)
G06K 1/00 (2006.01)
G06K 15/00 (2006.01)

(52) U.S. Cl. .................. 358/1.18; 358/1.16; 358/1.2

(58) Field of Classification Search .............. 358/1.16, 358/1.18, 1.2, 448, 514, 296; 382/112, 296; 355/55

See application file for complete search history.

(56) References Cited

U.S. PATENT DOCUMENTS

| 4,325,086 A | 4/1982 | Sato et al. |
| 4,553,160 A | 11/1985 | Yamamoto et al. |
| 4,743,947 A | * 5/1988 | Yamamoto .................. 399/188 |
| 4,853,748 A | 8/1989 | Okamoto et al. |
| 4,855,785 A | 8/1989 | Okamoto |
| 5,056,775 A | 10/1991 | Kida |
| 5,483,606 A | * 1/1996 | Denber ....................... 382/294 |
| 5,608,424 A | 3/1997 | Takahashi et al. |

(Continued)

FOREIGN PATENT DOCUMENTS

JP 62 42666 A 2/1987

(Continued)

OTHER PUBLICATIONS

Japanese Patent Office—Office Action (Japanese Language), 2 pages; English translation dated Apr. 22, 2003, 3 pages.

*Primary Examiner*—James A Thompson
(74) *Attorney, Agent, or Firm*—Foley & Lardner LLP (57) ABSTRACT

The present invention provides an image forming system in which an image of a document can always be printed in an appropriate position of paper with reliability even when a scanning magnification of the image is changed. The system therefore includes a scanner for scanning a document image to generate an image signal, a printer for forming a copying image on paper in response to the image signal supplied from the scanner, a paper feeding section for feeding the paper to the printer, a magnification setting section for setting a scanning magnification when the scanner scans the document image, and a timing control section for controlling timing of supply of the image signal from the scanner to the printer and/or timing of supply of the paper from the paper feeding section to the printer such that the size of a margin between the leading edge of the paper and that of the copying image formed on the paper is fixed irrespective of the scanning magnification.

9 Claims, 9 Drawing Sheets

U.S. PATENT DOCUMENTS

| | | |
|---|---|---|
| 5,668,637 A | 9/1997 | Yamaguchi |
| 5,734,760 A | 3/1998 | Yoshida |
| 6,178,005 B1 | 1/2001 | Yoshida |
| 6,433,886 B1 | 8/2002 | Sekiguchi |
| 6,510,138 B1 | 1/2003 | Pannell |
| 6,526,185 B1 | 2/2003 | Murakami |

FOREIGN PATENT DOCUMENTS

| | | |
|---|---|---|
| JP | 62-59943 A | 3/1987 |
| JP | 7-312686 A | 11/1995 |

* cited by examiner

IMAGE FORMING SYSTEM WITH SCANNER CAPABLE OF CHANGING MAGNIFICATION OF SCANNED IMAGE

The present application is a continuation of U.S. application Ser. No. 09/668,345, filed Sep. 25, 2000, the entire contents of which are incorporated herein by reference.

BACKGROUND OF THE INVENTION

In an image forming apparatus such as a copying machine, when a print key turns on, light is applied to a document set on a document glass and its reflected optical image is projected onto the light-receiving surface of a CCD (Charge Coupled Device) and converted into an electrical signal.

The light-receiving surface of the CCD has a number of pixels arranged in rows (horizontal direction) and columns (vertical direction). The CCD scans a document in the main and sub-scanning directions and outputs an image signal (analog signal) having a voltage level corresponding to the density of an optical image projected on the light-receiving surface.

An image forming apparatus capable of copying a color image includes a three-line sensor constituted by three line sensors (first to third line sensors) arranged at regular intervals (each corresponding to, e.g., eight lines) in the sub-scanning direction. A red-colored filter through which a red light beam passes is mounted on the first line sensor, a green-colored filter through which a green light beam passes is mounted on the second line sensor, and a blue-colored filter through which a blue light beam passes is mounted on the third line sensor. Firstly, the first line sensor outputs an image signal corresponding to a red-colored image. Secondly, the second line sensor outputs an image signal corresponding to a green-colored image. Lastly, the third line sensor outputs an image signal corresponding to a blue-colored image.

The image signal output from the first line sensor is converted to a digital signal serving as image data R by an A/D converter. The image signal output from the second line sensor is converted to a digital signal serving as image data G by an A/D converter. The image signal output from the third line sensor is converted to a digital signal serving as image data B by an A/D converter. Image processing is executed on the basis of the image data R, G and B to obtain a plurality of items of image data Y (yellow), M (magenta), C (cyan) and K (black) corresponding to a plurality of desired colors. These image data items Y, M, C and K drive a laser beam generator to start printing with a laser beam generated therefrom.

Since, as described above, the first to third line sensors are arranged at regular intervals, image data G is acquired after a lapse of a fixed time period after image data R is obtained. Similarly, image data B is acquired after a lapse of a fixed time period after image data G is obtained.

Consequently, in order to print a color image properly, the image data R and G are delayed and held in a memory until the image data B is obtained, and image processing is executed when the image data R, G and B are completed. Printing is thus started based on the image data items Y, M, C and K obtained from the image processing.

If, however, the above delay processing is performed when a scanning magnification is changed in the sub-scanning direction, there occurs a problem in which a writing position in the sub-scanning direction. (a printing start position in the sub-scanning direction of an image to be copied on paper) is shifted.

In other words, when the scanning magnification is 100%, a period of time required for delay processing due to a physical position of the line sensors corresponds to, for example, eight lines. However, when the magnification becomes 400%, the scanning speed is decreased to one quarter and accordingly the time period for delay processing corresponds to 32 lines.

In the three-line sensor, usually, the output timing of the sensors (the red-colored and green-colored line sensors) is adjusted in consistency with that of the sensor (the blue-colored line sensor) whose output is the last. When the scanning magnification is 100%, a delay process for 16 lines (=8×2) is required until the outputs of the three line sensors are completed, while a delay process for 64 lines (=8×4×2) is required when the magnification is 400%. The lines required to the delay process differ in number between the scanning magnification of 100% and that of 400% by 48 (=64−16).

In a prior art image forming apparatus, the timing at which a resist roller of a printer unit sends paper sheets to a photosensitive drum is set to that required when the scanning magnification is 100%. If, therefore, the magnification is changed to a value other than 100%, an image to be printed on the paper sheets deviates (from a position in the paper feeding direction or a writing position in the sub-scanning direction).

Assume, as a specific example, that the writing timing of a copied image is set so as to allow a margin (void width) of, e.g., 5 mm from the top of paper in the sub-scanning direction, taking into consideration that a delay process for 16 lines is executed when the scanning magnification is 100%. If the scanning magnification is changed to 400% under this assumption, the writing timing is delayed by 48 lines (=64−16), with the result that a margin (void width) of 5 mm is expanded by 48 lines (=8×4×2−16).

If the printing resolution is, for example, 600 dpi, the margin is increased by about 2 mm, and the increased margin becomes 7 mm (5 mm+2 mm) when the scanning magnification is 400% under the above assumption. In other words, if the scanning magnification changes from 100% to 400%, the margin (void width) deviates by 2 mm.

BRIEF SUMMARY OF THE INVENTION

The object of the present invention is to provide an image forming system (apparatus and method) which allows an image of a document to be always printed in an appropriate position on paper with reliability even when a scanning magnification of the image is changed.

In order to attain the above object, an image forming apparatus according to the present invention comprises an image reading section for reading a document image to generate an image signal; an image forming section for forming a copying image corresponding to the image signal supplied from the image reading section, on paper (image receiving medium); a paper feeding section for feeding the paper to the image forming section; a magnification setting section for setting a reading magnification when the document image is read by the image reading section; and a timing control section for controlling at least one of timing of supply of the image signal from the image reading section to the image forming section and timing of feed of the paper from the paper feeding section to the image forming section such that a size of a margin (a void width) between a leading edge of the paper and that of the copying image formed on the paper is fixed irrespective of the reading magnification.

In order to attain the above object, an image forming method according to the present invention is practiced using a system including a scanner for scanning an image of a document to output an image signal, a printer for copying the image onto paper in response to the image signal, and a scanning magnification setting section for setting a scanning magnification when the scanner scans the document, the scanner including an image sensor for outputting a signal generated by optically scanning the document in a main scanning direction and a sub-scanning direction perpendicular to the main scanning direction, and the printer including a sub-scanning start signal generation section for generating a sub-scanning start signal for causing the scanner to start scanning the document in the sub-scanning direction.

In this image forming method, the system checks whether the scanning magnification is changed and, when the scanning magnification is changed by the scanning magnification setting section, the system varies timing at which the sub-scanning start signal is generated in accordance with the changed scanning magnification.

Figure 7:
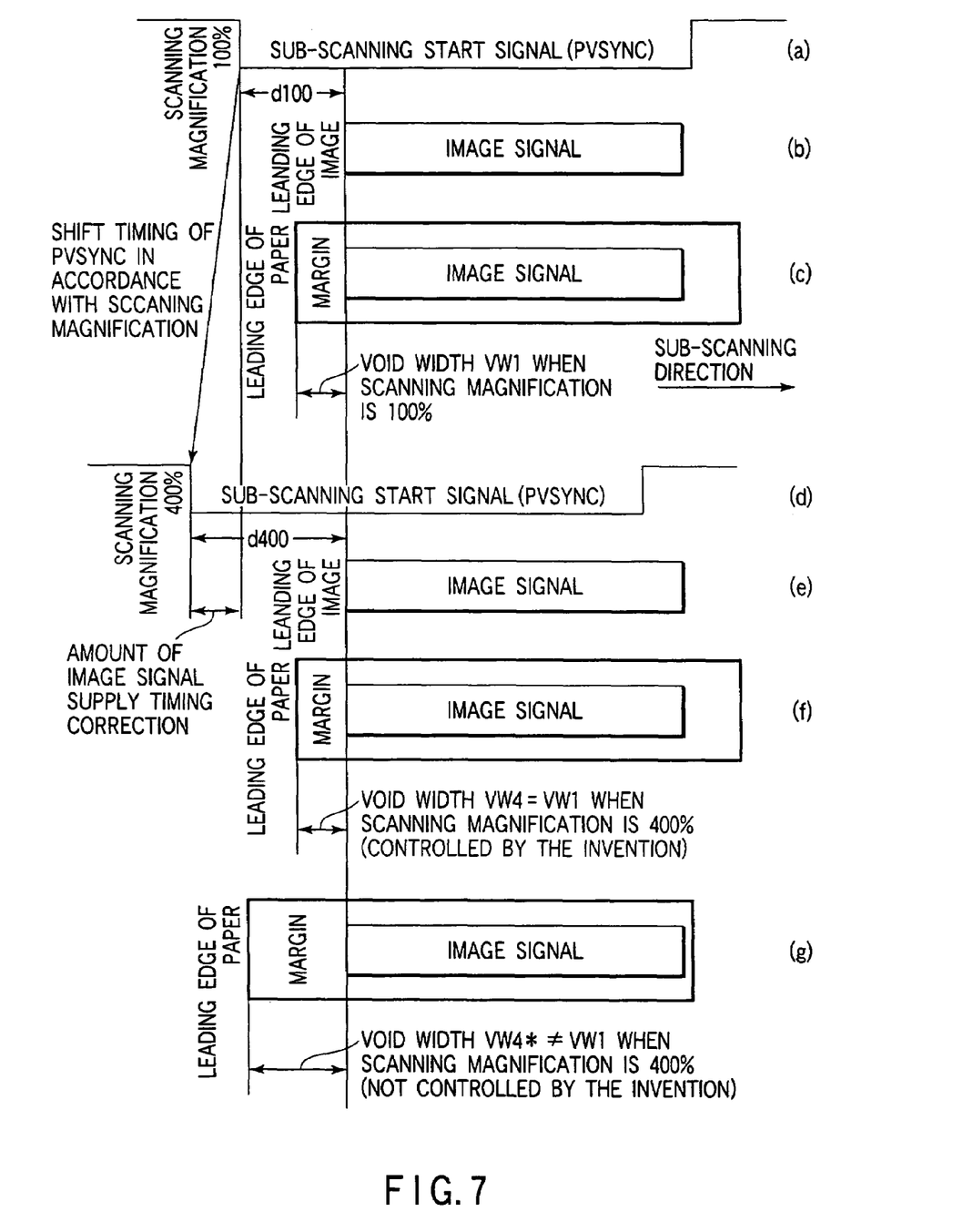
FIG. 7 is a schematic diagram explaining a first method of fixing a margin (void width) between the leading edge of paper and that of an image formed on the paper, irrespective of the image scanning magnification of a scanner, when the structure shown in FIG. 5 is applied to those shown in FIGS. 1 to 4.

The above timing is changed such that a size of a margin (a void width) between the leading edge of the paper and that of the image copied onto the paper is fixed irrespective a change in the scanning magnification (see (f) in FIG. 7).

In order to attain the above object, another image forming method according to the present invention is practiced using a system including a scanner for scanning an image of a document to output an image signal, a printer for copying the image onto paper in response to the image signal, and a scanning magnification setting section for setting a scanning magnification when the scanner scans the document, the scanner including a delay memory for temporarily storing the image signal and then outputting the image signal, and the printer including a paper feeding section for feeding the paper.

In this image forming method, the system checks whether the scanning magnification is changed and, when the scanning magnification is changed by the scanning magnification setting section, the system varies relative timing between timing at which the image signal is output from the delay memory and timing at which the paper is fed by the paper feeding section in accordance with the changed scanning magnification.

The above relative timing is changed such that a size of a margin (a void width) between the leading edge of the paper and that of the image copied onto the paper is fixed irrespective a change in the scanning magnification.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

[1] First, the structure of the whole of an image forming apparatus (a digital color copying machine) according to an embodiment of the present invention will be described with reference to FIGS. 1 to 4.

Figure 1:
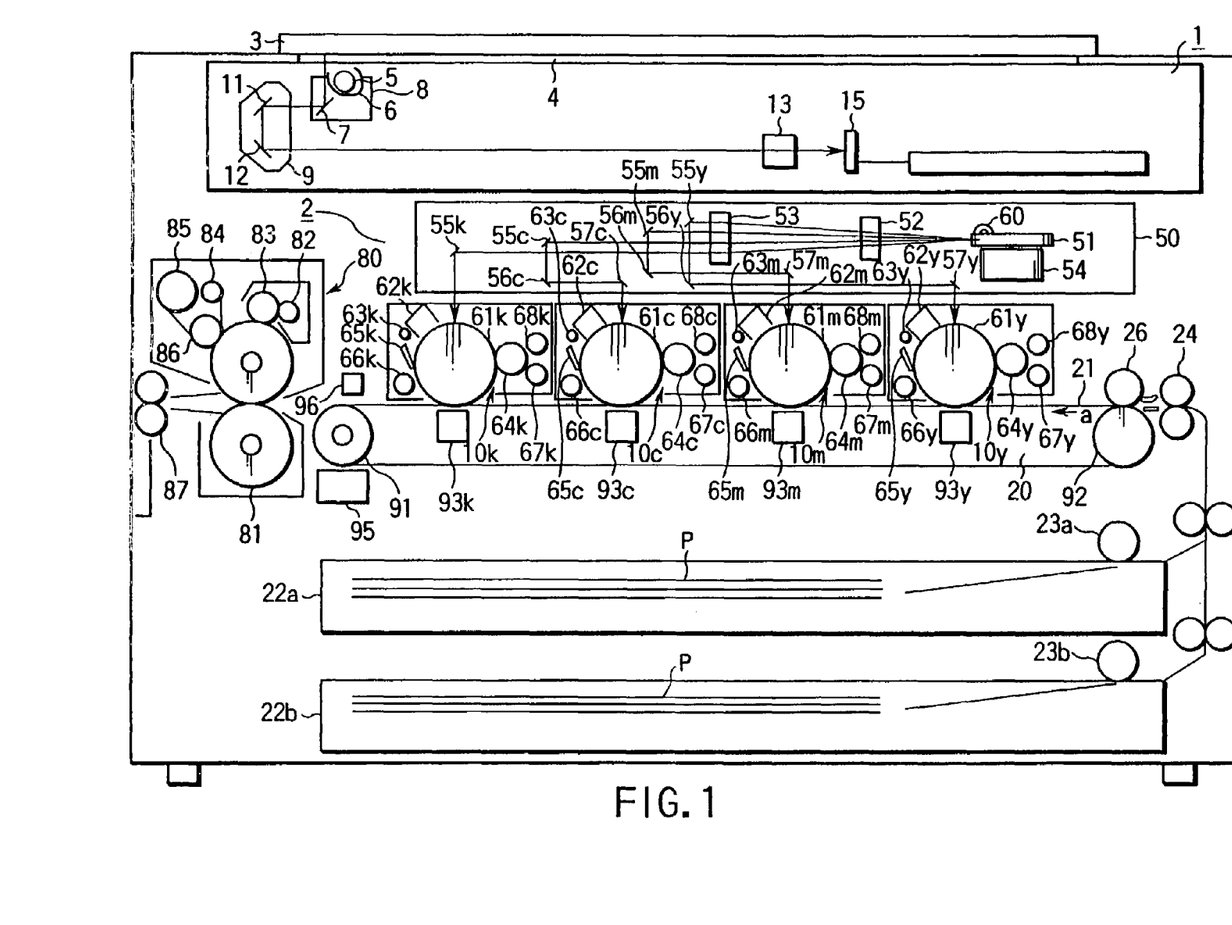
FIG. 1 is a view illustrating the internal structure of a color copying machine.

FIG. 1 schematically shows the internal structure of an image forming apparatus, such as a digital color copying machine, according to the embodiment of the present invention.

The image forming apparatus is chiefly constituted of a scanner unit 1 serving as an image scanning means for scanning a color image on a document (not shown) and a tandem type printer unit 2 including four image forming means for forming a copied image of the scanned color image.

The scanner unit 1 has a document glass cover 3 thereabove and a document glass 4 on which a document is set opposite to the cover 3 in a closed state. The document glass is constituted of transparent glass or the like.

A lamp 5 for illuminating the document placed on the document glass 4, a reflector 6 for focusing light from the lamp 5 on the document, and a first mirror 7 for turning the light reflected from the document to the left on FIG. 1, are arranged under the document glass 4. The lamp 5, reflector 6, and first mirror 7 are fixed to a first carriage 8. The first carriage is driven by a pulse motor (not shown) through a toothed belt (not shown) and moves in parallel with the underside of the document glass 4.

A second carriage 9, which can be moved in parallel with the document glass 4 by means of a driving mechanism (not shown), such as a toothed belt and a DC motor, is provided on the left side of the first carriage 8 in FIG. 1 or in the direction that guides the light reflected by the first mirror 7. The second carriage 9 includes a second mirror 11 for turning the light reflected by the document and guided by the first mirror 7 downward in FIG. 1 and a third mirror 12 for turning the light from the second mirror to the right in FIG. 1. The second and third mirrors 11 and 12 are arranged to form a right angle. The second carriage 9 is driven by the first carriage 8 and moved in parallel with the document glass 4 at half the speed of the first carriage 8.

An image-forming lens 13 for forming an image from the light reflected by the third mirror 12 at a given magnification is disposed within the plane including the optical axes of light turned by the second and third mirrors 11 and 12. A CCD sensor (photoelectrical converting element) 15 for converting the reflected light provided with convergence by the image-forming lens 13 into an electrical signal, is arranged within the plane almost perpendicular to the optical axis of light passing through the lens 13. Specifically, the CCD sensor 15 is constituted of three line sensors corresponding to the three primary colors of light.

If the light from the lamp 5 is focused on the document on the document glass 4 by the reflector 6, the light reflected by the document enters the CCD sensor 15 through the first mirror 7, second mirror 11, third mirror 12, and image-forming lens 13. The incident light is converted into image signals (electrical signals) corresponding to the three primary colors of R (red), G (green) and B (blue).

The printer unit 2 includes an image-forming block for forming an image corresponding to each color component obtained by color separation through the known subtractive color process. The image-forming block has a first image-forming section 10y, a second image-forming section 10m, a third image-forming section 10c and a fourth image-forming section 10k for forming their respective four color images of yellow (Y), magenta (M), cyan (C) and black (K) that an operator wishes to express.

A conveying mechanism 20 including a conveyor belt 21 is provided under the image-forming sections 10y, 10m, 10c and 10k as a conveying means for conveying the images of different colors formed by the image-forming sections in the direction of arrow a. The conveyor belt 21 is looped between a driving roller 91 rotated by the motor (not shown) in the direction of arrow a and a driven motor 92 provided at a given distance from the driving roller 91, and runs endlessly in the direction of arrow a at a fixed speed. The image-forming sections 10y, 10m, 10c and 10k are arranged in series along the conveying direction of the conveyor belt 21.

The image-forming sections 10y, 10m, 10c and 10k include their respective photosensitive drums 61y, 61m, 61c and 61k serving as image bearing bodies which can be moved in the same direction in a position contacting the conveyor belt 21. The photosensitive drums 61y, 61m, 61c and 61k are rotated at a given circumferential velocity by the motor (not shown).

The photosensitive drums 61y, 61m, 61c and 61k are disposed such that their rotating shaft lines are arranged at regular intervals, and the shaft lines cross a direction in which an image is conveyed by the conveyor belt 21 at right angles. Assume hereinafter that the shaft lines of the photosensitive drums 61y, 61m, 61c and 61k are defined as a main scanning direction and the rotation thereof or the rotation of the conveyor belt 21 (direction of arrow a) is defined as a sub-scanning direction.

Charging devices 62y, 62m, 62c and 62k serving as charging means extending in the main scanning direction, eliminating devices 63y, 63m, 63c and 63k, developing rollers 64y, 64m, 64c and 64k serving as developing means extended in the main scanning direction, lower agitating rollers 67y, 67m, 67c and 67k, upper agitating rollers 68y, 68m, 68c and 68k, transferring devices 93y, 93m, 93c and 93k serving as transfer means extended in the main scanning direction, cleaning blades 65y, 65m, 65c and 65k extended in the main scanning direction, and discharged-toner reclaim screws 66y, 66m, 66c and 66k, are arranged in sequence around the photosensitive drums 61y, 61m, 61c and 61k along the rotating direction of the photosensitive drums 61y, 61m, 61c and 61k, respectively.

The transferring devices 93y, 93m, 93c and 93k are arranged in positions that support the conveyor belt 21 together with their corresponding photosensitive drums 61y, 61m, 61c and 61k or they are arranged inside the conveyor belt 21. The exposure points of an exposure device 50 (described later) are formed on the outer surfaces of the photosensitive drums 61y, 61m, 61c and 61k between the charging devices 62y, 62m, 62c and 62k and the developing rollers 64y, 64m, 64c and 64k, respectively.

Paper cassettes 22a and 22b for holding a plurality of paper sheets P as image-formed mediums to which images formed by the image-forming sections 10y, 10m, 10c and 10k are transferred, are arranged under the conveying mechanism 20.

Pickup rollers 23a and 23b for picking up the paper sheets P in the paper cassettes 22a and 22b one by one from the top, are arranged at their end portions of the paper cassettes 22a and 22b and near the driven roller 92. A resist roller 24 for aligning the leading edges of paper sheets P picked up from the paper cassettes 22a and 22b with that of a Y-toner image formed on the photosensitive drum 61y of the image-forming section 10y, is provided between the pickup rollers 23a and 23b and the driven roller 92.

The toner images formed on the other photosensitive drums 61m, 61c and 61k are supplied to their conveyance positions in accordance with timing of paper sheets P conveyed on the conveyor belt 21.

An adsorption roller 26 for giving electrostatic adsorptivity to the paper sheets P conveyed with predetermined timing by means of the resist roller 24, is provided between the resist roller 24 and the first image-forming section 10y and near the driven roller 92, or the roller 26 is provided on the outer surface of the driven roller 92 that catches the conveyor belt 21 in substance. The shaft line of the adsorption roller 26 and that of the driven roller 92 are parallel with each other.

A displacement sensor 96 for sensing a position of an image formed on the conveyor belt 21 is provided at one end of the conveyor belt 21 and near the driving roller 91 or on the outer surface of the driving roller 91 that catches the conveyor belt 21 in substance. The displacement sensor 96 is constituted of a transmission or reflection light sensor.

A conveyance belt cleaning device 95 for removing toner attached to the conveyor belt 21 or wastes of paper sheets P is provided on the outer surface of the driving roller 91 and on the conveyor belt 21 downstream from the displacement sensor 96.

A fixing device 80 is provided in which direction a paper sheet P conveyed by the conveyor belt 21 is separated from the driving roller 91 and then conveyed again. The fixing device 80 is used to fuse a toner image formed on the paper sheet P by heating the sheet P at a given temperature and fix the toner image on the sheet P. The device 80 includes a heat roller pair 81, oil applying rollers 82 and 83, a web take-up roller 84, a web roller 85, and a web pressing roller 86. With the fixing device 80, the toner image can be fixed on the paper sheet P and the paper sheet P can be discharged by a discharging roller pair 87.

The print engine (exposure device) 50 is used to form electrostatic latent images obtained by color separation on the outer surfaces of the photosensitive drums 61y, 61m, 61c and 61k. The print engine 50 includes a semiconductor laser beam generator 60 for controlling emission of laser beams on the basis of image data (Y, M, C and K) corresponding to respective colors obtained by color separation in an image processing section 36 which will be described later.

A polygon mirror 51 which is rotated by a polygon motor 54 to reflect/scan a laser beam is arranged on the optical path of the semiconductor laser beam generator, and so are fθ lenses 52 and 53 for correcting a focal point of the laser beam reflected by the polygon mirror 51 to form an image.

First return mirrors 55*y*, 55*m*, 55*c* and 55*k* are each interposed between the fθ lens 53 and its corresponding one of the photosensitive drums 61*y*, 61*m*, 61*c* and 61*k* in order to return the laser beams of respective colors, which pass through the fθ lens 53, toward the exposure positions of the photosensitive drums 61*y*, 61*m*, 61*c* and 61*k*. Further, second return mirrors 56*y*, 56*m* and 56*c* and third return mirrors 57*y*, 57*m* and 57*c* are arranged in order to return the laser beams returned by the first return mirrors 55*y*, 55*m*, 55*c* and 55*k*.

The laser beam for black color images is returned by the first return mirror 55*k* and then guided to the photosensitive drum 61*k* but not through the other return mirrors.

Figure 2:
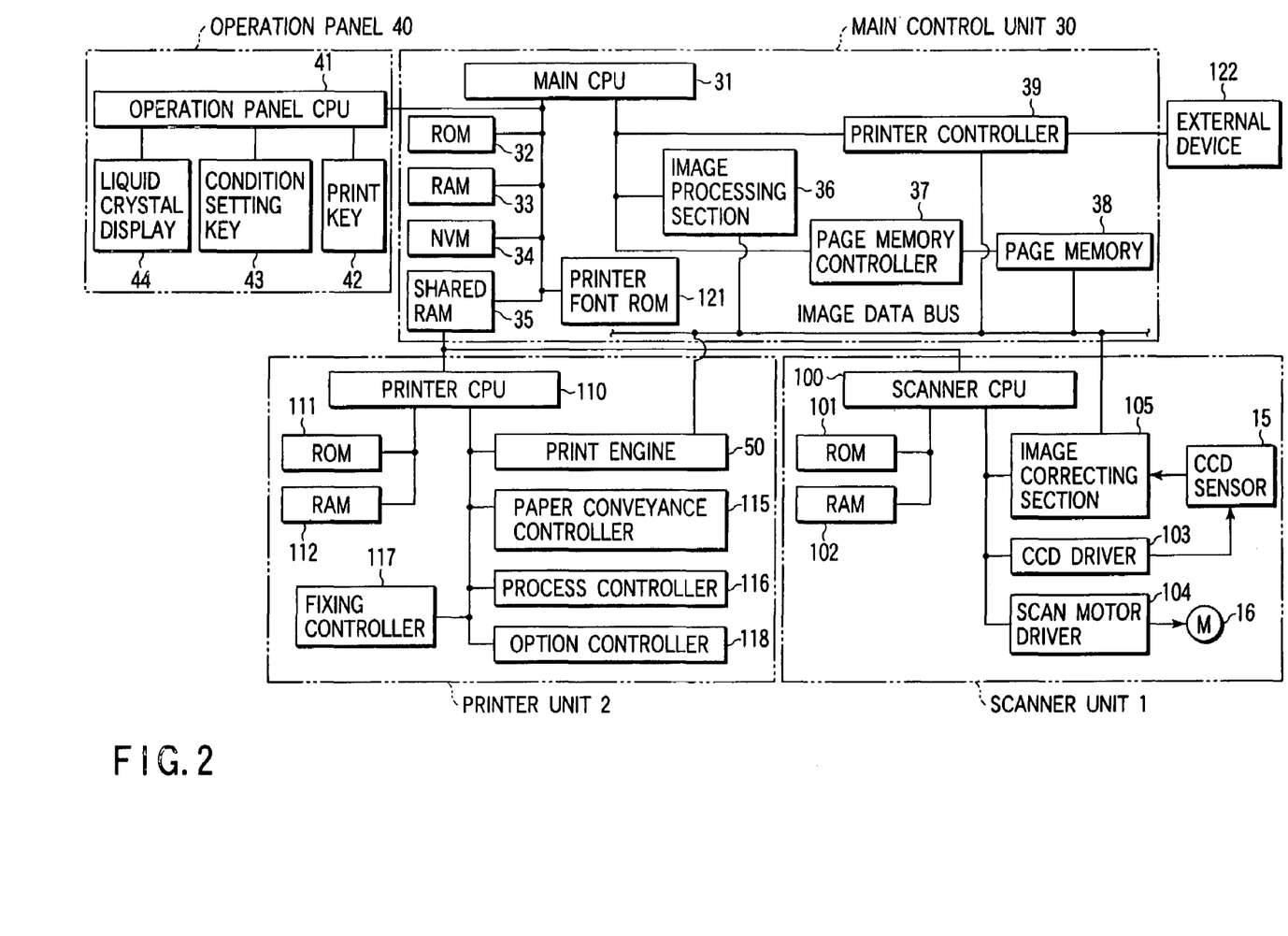
FIG. 2 is a block diagram explaining the structure of a control system of the machine shown in FIG. 1.

FIG. 2 is a block diagram explaining the structure of a control system of the apparatus shown in FIG. 1.

An operation panel 40 is provided in the upper part of the apparatus shown in FIG. 1 and includes an operation panel CPU 41. A print key 42, a condition setting key 43, and a liquid crystal display 44 are connected to the operation panel CPU 41. The CPU 41 is connected to a main CPU 31 of a main control unit 30.

The condition setting key 43 is intended for setting of various conditions such as the print number and the print magnification (scanning magnification of documents scanned by the scanner unit 1). For example, equal magnification (100%), two-times magnification (200%), and four-times magnification (400%) are prepared as the print magnification.

The main control unit 30 includes a main CPU 31, a ROM 32, a RAM 33, an NVM (nonvolatile random-access memory) 34, a shared RAM 35, an image processing section 36, a page memory controller 37, a page memory 38, a printer controller 39, and a printer font ROM 121.

The main CPU 31 controls the whole of the apparatus. The ROM 32 stores control programs for controlling the apparatus. The ROM 32 can also store firmware for executing the processing shown in FIGS. 9 and 10 (which will be described later).

The RAM 33 serves as a work area when the programs of the ROM 32 are executed and stores various types of data temporarily.

The NVM 34 can be constituted of a nonvolatile memory (SRAM of CMOS type) backed up by a battery (not shown) or an EEPROM. The NVM 34 can be used to store various parameters that a user has set (so as to prevent them from being lost even when the power supply voltage of the apparatus drops.

The shared RAM 35 is used for bi-directional communications between the CPU 31 and printer CPU 110 and for those between the CPU 31 and scanner CPU 100.

The main CPU 31 allows the shared RAM 35 to store an instruction to the scanner CPU 100 (a PVSYNC change instruction in FIG. 7 or a timing change instruction in step ST102 in FIG. 9) and/or an instruction to the printer CPU 110 (a paper feed timing change instruction in FIG. 8 or a control instruction in step ST202 in FIG. 10) and the other instructions when the need arises. By doing so, the scanner CPU 100 and/or printer CPU 110 are allowed to acquire a necessary instruction from the shared RAM 35.

Information from the scanner CPU 100 and/or the printer CPU 110 can be written to the shared RAM 35 as required. The main CPU 31 reads the writing of information to the shared RAM 35 and thus recognizes the current operating states of the scanner unit 1 and/or the printer unit 2.

The shared RAM 35 can be employed as a transit area for transferring information (e.g., scanner's sub-scanning starting instruction) from the printer CPU 110 to the scanner CPU 100 (the system can be configured such that information is directly exchanged between the scanner CPU 100 and the printer CPU 110 but not through the shared RAM 35).

The page memory controller 37 writes image data to the page memory 38 and reads it out of the memory 38. The page memory 38 is able to store image data corresponding to a plurality of pages. The printer controller 39 expands print data, which is supplied from an external device 122 such as a personal computer, to image data. The printer font ROM 121 stores font data.

The scanner unit 1 includes a scanner CPU 100, a ROM 101, a RAM 102, a CCD driver 103, a scan motor driver 104, and an image correcting section 105. The ROM 101 stores control programs used for the scanner unit. The RAM 102 serves as a work area for temporarily storing various types of data when the programs are executed. The CCD driver 103 drives the CCD sensor 15. The scan motor driver 104 drives the driving motor 16 for driving the carriages 8 and 9 and various mirrors.

The image correcting section 105 includes A/D converters (ADC) for respectively converting image signals (analog signals of R, G, B) output from the CCD sensor 15 into digital signals, a shading correction circuit, and a line memory.

The main CPU 31 constitutes the following means (1) in association with the operation panel CPU 41 and the scanner CPU 100.

(1) Magnification setting means for variably setting the scanning speed (corresponding to the scanner's scanning magnification) of the CCD sensor 15 in the sub-scanning direction in accordance with the print magnification set by the condition setting key 43 of the operation panel 40.

More specifically, when the print magnification is set to 1× magnification (scanning magnification: 100%), the scanning speed of the CCD sensor 15 in the sub-scanning direction is set to a predetermined standard value. When the print magnification is set to 2× magnification (200%), the scanning speed is set to half the standard value. When the print magnification is set to 4× magnification (400%), the scanning speed is set to one-fourth the standard value.

The printer unit 2 includes a printer CPU 110, a ROM 111, a RAM 112, a paper conveyance controller 115, a process controller 116, a fixing controller 117, an option controller 118, and the print engine 50 described above. The ROM 111 stores control programs used for the printer unit. The RAM 112 serves as a work area for temporarily storing various types of data when the programs are executed. The paper conveyance controller 115 controls the conveyance of paper sheets P shown in FIG. 1. The process controller 116 controls a process such as charging, development, and transfer.

The image processing section 36, page memory 38, and printer controller 39 of the main control unit 30 are connected to the print engine 50 of the printer unit 2 and the image correcting section 105 of the scanner unit 1 through image data buses. This connection allows a document scanning image signal (RGB data) output from the image correcting section 105 to be supplied to the image processing section 36 in the main control unit 30.

Figure 3:
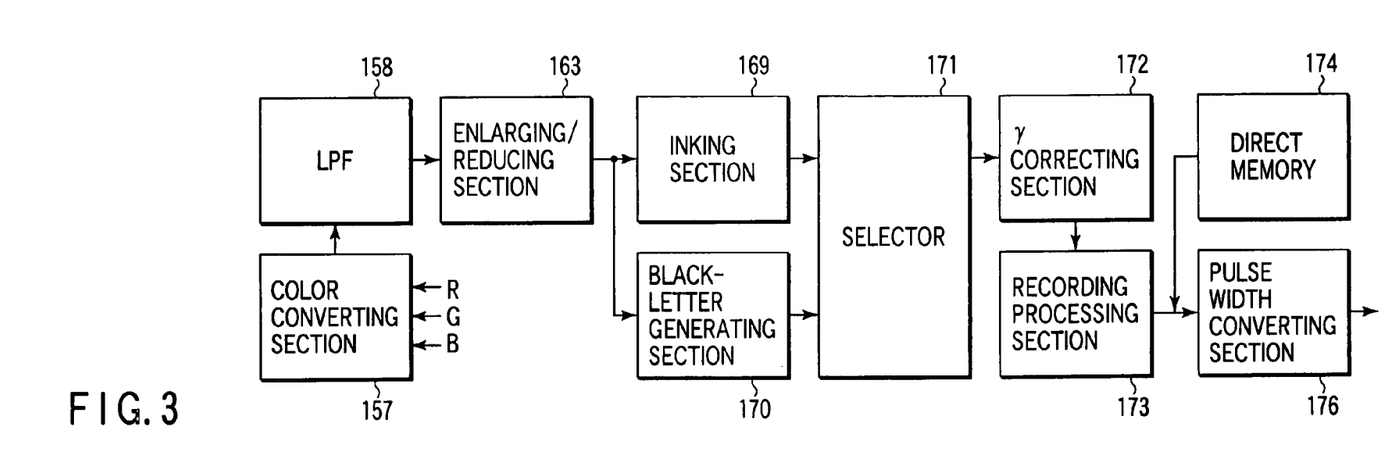
FIG. 3 is a block diagram explaining the internal structure of an image processing unit in the control system shown in FIG. 2.

FIG. 3 is a block diagram explaining the internal structure of the image processing section 36 illustrated in FIG. 2.

The document scanning image signal (RGB data) output from the image correcting section 105 shown in FIG. 2 is supplied to a color converting section 157 in the image processing section 36. The color image data supplied from the scanner unit 1 to the image processing section 36 are R, G and B, whereas the color image data processed by the printer unit 2 are C, M, Y and K; therefore, the color image data have to be converted. The color converting section 157 converts the image data R, G and B into image data C, M and Y corresponding to a plurality of colors that a user desires. The color of print images can be adjusted by selecting color conversion parameters in the color converting section 157 to meet the user's needs.

The outputs (image data C, M and Y) of the color converting section 157 are sent to a low-pass filter (LPF) 158. The low-pass filter 158 executes a spatial filter process of eliminating noise and moiré from a document image scanned by the scanner unit 1.

The output of the low-pass filter 158 is sent to an enlarging/reducing section 163. This section 163 allows a scanned image to be enlarged/reduced digitally in the main scanning direction (the enlargement/reduction of a scanned image in the sub-scanning direction can be performed by changing a scanning speed of the CCD 15 in the sub-scanning direction).

The outputs of the enlarging/reducing section 163 are supplied to an inking section 169 and a black-letter generating section 170. The inking section 169 generates black data K from the image data C, M and Y supplied thereto to perform an inking process of adding the black data K to the image data C, M and Y. The black-letter generating section 170 superimposes image data C, M and Y one on another to generate black data K.

Black letters of high quality in both color purity and resolution (definition) can be obtained by using one color of black rather than by superimposing three different image data C, M and Y. In this example, the black data K from the inking section 169 is used, which increases the color purity and resolution of black letters further. In a document containing not letters but photos requiring multilevels (or fine gradations), however, the resolution becomes higher if black data K from the black-letter generating section 170 is used. For this reason, the image processing section shown in FIG. 3 is so constituted that one of outputs of the inking section 169 and black-letter generating section 170 can be selected by a selector 171.

The image data C, M, Y and K selected by the selector 171 are supplied to a γ correcting section 172. The section 172 corrects γ characteristics of the printer unit 2. This correction is performed with reference to a γ table (not shown) set for each image data C, M, Y and K.

The output of the γ correcting section 172 is sent to a recording processing section 173. The section 173 performs a gradation process such as error diffusing. For example, the γ recording section 172 converts image data (C, M, Y and K) whose quantization bit number is eight into data of about four bits, without degrading the seeming tone.

In the tandem type image forming apparatus including four image-forming sections 10y, 10m, 10c and 10k connected in series as shown in FIG. 1, the phases of recording image data of four colors (C, M, Y and K) are different from one another. Image data of the first three colors (C, M and Y) is therefore stored temporarily in a direct memory 174 and the image data (C, M and Y) is delayed in accordance with a shift in phase.

The outputs (C, M, Y and K) of the recording processing section 173, the phase shift of which is canceled by delaying the image data in the direct memory 174, are supplied to a pulse width changing section 176.

The relationship between signal levels of image signals processed by the respective sections shown in FIG. 3 and recording density (print density) is not linear. The pulse-width changing section 176 controls pulse driving time of a laser modulating section (not shown) of the printer unit 2 to change a pulse width of each of the signals such that the above relationship can provide linear characteristics and send the signals (C, M, Y and K) to the printer unit 2.

Figure 4:
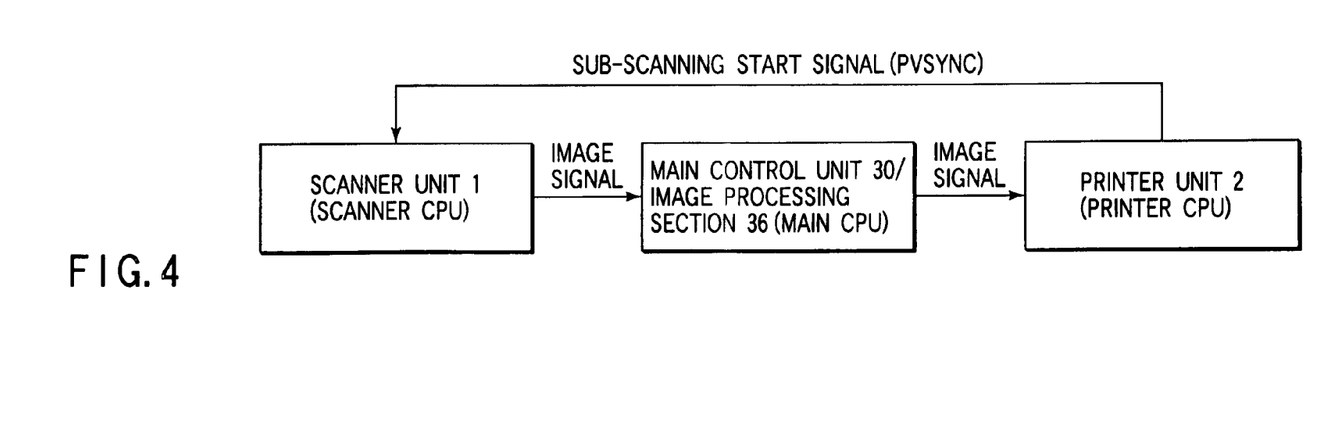
FIG. 4 is a block diagram showing a scanner unit, an image processing unit, and a printer unit into which the structures shown in FIGS. 1 and 2 are divided broadly.

FIG. 4 is a block diagram showing the scanner unit 1, the image processing section 36 and the printer unit 2 into which the structures shown in FIGS. 1 and 2 are divided broadly.

The image signal (RGB data) output from the image correcting section 105 of the scanner unit 1 is supplied to the image processing section 36 of the main controller 30 through an image data bus shown in FIG. 2. The image signal (RGB data) is then processed by the structure shown in FIG. 3, and the processed image signal (CMYK data) is supplied to the print engine 50 of the printer unit 2 through an image data bus.

When an image corresponding to a document scanning image is formed by the print engine 50, it is necessary to notify the scanner unit 1 of time when scanning in the sub-scanning direction starts. To do so, the printer CPU 110 of the printer unit 2 is so constituted that it supplies a sub-scanning start signal (PVSYNC signal) to the scanner CPU 100 of the scanner unit 1 at given timing. In other words, the PVSYNC signal supplied from the printer CPU 110 specifies the sub-scanning timing.

The printer CPU 110 controls paper conveyance timing in the printer unit 2 through the paper conveyance controller 115 shown in FIG. 2, while CPU 110 specifies timing when the scanner unit 1 starts to scan the document in response to the PVSYNC signal. The supply timing of the PVSYNC signal makes it possible to determine not only the timing at which the printer unit 2 conveys a paper sheet P but also the position of the paper sheet P from which a document image starts to be formed (or an image is written to the paper sheet P).

[2] The control system according to the first embodiment of the present invention will now be described with reference to FIGS. 5, 7 and 9.

Figure 5:
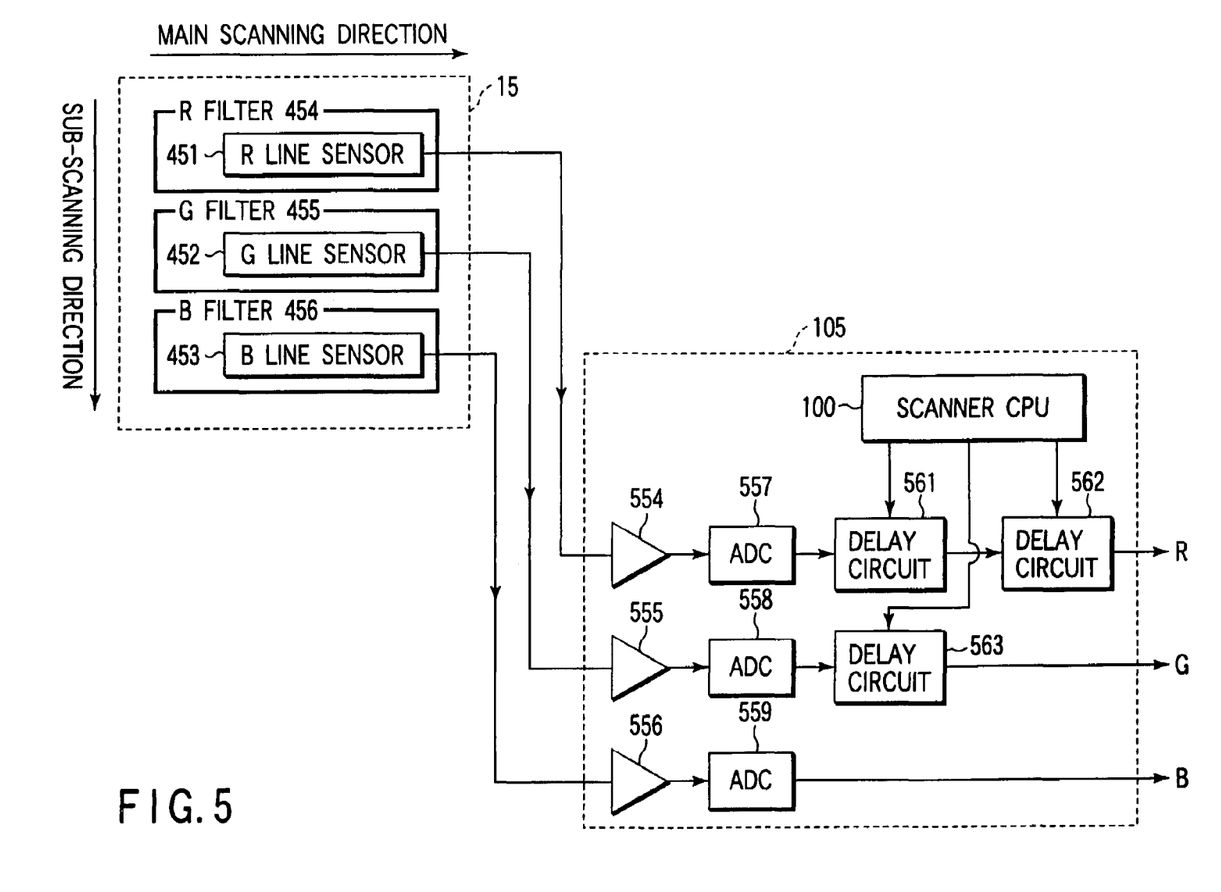
FIG. 5 is a diagram showing an example of the internal structures of a CCD sensor and an image correcting unit included in the scanner unit shown in FIG. 2.

FIG. 5 is a diagram showing an internal structure (example 1) of the CCD sensor and the image correcting section included in the scanner unit illustrated in FIG. 2.

The CCD sensor 15 includes an R line sensor 451 for red color, a G line sensor 452 for green color, and a B line sensor 453 for blue color. Each of the line sensors is constituted by a number of photoelectric converting elements (CCD elements) arranged in line in the longitudinal direction. An R filter 454 through which red-colored optical components pass selectively is provided on the light-receiving surface of the R line sensor 451, a G filter 455 through which green-colored optical components pass selectively is provided on the light-receiving surface of the G line sensor 452, and a B filter 456 through which blue-colored optical components pass selectively is provided on the light-receiving surface of the B line sensor 453. These line sensors are arranged at given intervals (e.g., each corresponding to 8 lines) in the sub-scanning direction and their longitudinal directions are parallel with the main scanning direction.

An R photoelectric converting signal output from the R line sensor 451, a G photoelectric converting signal output from the G line sensor 452, and a B photoelectric converting signal output from the B line sensor 453 (which are three-primary-color photoelectric converting signals each having a voltage level corresponding to the light and shade of an optical image projected on the light-receiving surface of the CCD 15), are input to their respective buffer amplifiers 554 to 556 in the image correcting section 105.

The R, G and B photoelectric converting signals output from the line sensors 451 to 453 are amplified by the buffer amplifiers 554 to 556 and supplied to A/D converters (ADC) 557 to 559, respectively.

The ADC 557 converts the R photoelectric converting signal (analog voltage) into its corresponding digital data R. The ADC 558 converts the G photoelectric converting signal (analog voltage) into its corresponding digital data G. The ADC 559 converts the B photoelectric converting signal (analog voltage) into its corresponding digital data B.

The digital data R is delayed by a delay circuit 561 by time corresponding to an interval (eight lines) between the R and G line sensors 451 and 452. The delayed data R is further delayed by a delay circuit 562 by time corresponding to an interval (eight lines) between the G and B line sensors 452 and 453.

The digital data G is delayed by a delay circuit by time corresponding to an interval (eight lines) between the G and B line sensors 452 and 453.

The digital data B need not be delayed in the embodiment shown in FIG. 5.

The delay time of each of the delay circuits 561 to 563 can be set arbitrarily by the scanner CPU 100. The scanner CPU 100 is programmed to set the delay time of the delay circuits 561 to 563 such that the digital data R and digital data G can be output from the image correcting section 105 at the same timing as that of the digital data B.

More specifically, in this embodiment, the delay time of each of the delay circuits 561 to 563 corresponds to eight lines when the scanning magnification (print magnification) is 100%. Therefore, the data R is delayed by 16 (=8×2) lines, the G data is delayed by 8 lines, and the B data is not delayed, with the result that a difference in timing among the R, G and B signals output from the image correcting section 105 when the magnification is 100% can be made zero.

If the scanning magnification (print magnification) is changed to 400%, the delay time of each of the delay circuits 561 to 563 corresponds to 32 (=8×4) lines. In this case, the R data is delayed by 64 (=8×2×4) lines, the G data is delayed by 32 (=8×4) lines, and the B data is not delayed, with the result that a difference in timing among the R, G and B signals output from the image correcting section 105 when the magnification is 400% can be made zero.

However, there is a difference of 48 (64−16) lines between the delay time of data R at the magnification of 100% and that of data R at the magnification of 400%. This difference causes a void width (a margin between the leading edge of paper and that of an image formed on the paper) to vary between the magnification of 100% and that of 400%.

As a first means for resolving the above problem of "variations in void width with scanning magnification (print magnification)," the main CPU 31 constitutes the following means (2) in association with the printer CPU 110:

(2) Timing control means for controlling (cf. (a) and (d) in FIG. 7) supply timing (generation timing of PVSYNC in FIG. 4) of an image signal (CMYK) from the scanner unit 1 to the printer unit 2 such that the void width is fixed irrespective of the scanning magnification (cf. (f) in FIG. 7).

The mechanism for fixing the void width irrespective of the scanning magnification will be described later with reference to FIG. 7, and the control process for doing the same will also be described with reference to FIG. 9.

According to the embodiment shown in FIG. 5, the scanner CPU 100 can intentionally delay the timing from when it receives the sub-scanning start signal (PVSYNC signal) until when it starts to scan an image, in consideration of an image delay corresponding to the scanning magnification of a three-line image sensor constituting the CCD sensor 15 of the scanner unit 2. A CPU timer (not shown) can be used for the control of delaying the timing intentionally.

Further, the scanning magnification can be transmitted from the scanner CPU 100 to the printer CPU 110 to vary the supply timing of PVSYNC signal itself with an image delay depending on the scanning magnification of the three-line image sensor.

With the control of the supply timing, the printing start position of an image output to a copying sheet (the image writing start position in the sub-scanning direction) can be fixed irrespective of the document scanning magnification (100%, 200%, 400%, etc.) of the scanner unit 2.

FIG. 7 is a schematic diagram explaining a first method of fixing a margin (void width) between the leading edge of paper and that of an image formed on the paper, irrespective of the image scanning magnification of a scanner, when the structure shown in FIG. 5 is applied to those shown in FIGS. 1 to 4. FIG. 9 is a flowchart explaining a process corresponding to the first method shown in FIG. 7.

In the case of FIG. 7, the four image forming sections 10y, 10m, 10c and 10k shown in FIG. 1 are not explained separately but together. Assuming that a color print is completed in a position of the black-image forming section 10k (a difference in position among image forming sections 10y, 10m, 10c and 10k is corrected by the direct memory 174 shown in FIG. 3), the image forming section will be described.

The case of scanning magnification of 100% (default setting) will be described first. When the print key 42 shown in FIG. 2 is depressed to start copying at the magnification of 100% (NO in step ST100), a sub-scanning start signal (PVSYNC signal) in (a) of FIG. 7 is supplied. Then, the printer unit 2 starts to supply the scanner CPU 100 with a PVSYNC signal (step ST104).

If the printer unit 2 starts, the printer CPU 110 starts to convey paper P (step ST106). The paper P is conveyed to a given position of the image forming section 10k after a given period of time from the leading edge of the PVSYNC signal supplied in step ST104 ((c) in FIG. 7).

In response to the leading edge of the PVSYNC signal, the scanner CPU 100 causes the scanner unit 1 to start optical main scanning and sub-scanning for a document (not shown) (step ST108).

Then, the main CPU 31 causes the image processing section 36 to process images corresponding to image signals (R, G and B) generated by the main scanning and sub-scanning in step ST108 (step ST110).

Subsequently, the image data (YMCK) processed in step ST110 and the paper P conveyed in step ST106 are supplied for image formation (step ST112). In this image formation, image data (YMCK) or the content of the image signal ((b) in FIG. 7) generated from the scanner unit 1 starts to be printed at a distance of a given void width VW1 from the leading edge of paper P (step ST114).

In (a) to (c) of FIG. 7, an interval between the leading edge of the content of the image signal formed on paper P and that of the PVSYNC signal is represented as d100.

The above control of fixing the void width VW1 of 100% scanning magnification ((c) in FIG. 7) irrespective of the scanning magnification, is performed as follows.

When a user designates the scanning magnification of 400% from the condition setting key 43 shown in FIG. 2 and depresses the print key 42, the scanning magnification is changed from 100% to 400% (YES in step ST100) and thus the sub-scanning timing (generation timing of PVSYNC signal) is changed by the printer CPU 110 (step ST102).

If a low magnification is changed to a high magnification (100% is changed to 400%), the timing is changed such that the PVSYNC-signal generation timing is quickened (cf. (a) and (d) in FIG. 7). If a high magnification is changed to a low magnification (100% is changed to 50%), the timing is changed such that the PVSYNC-signal generation timing is delayed (not shown). Hereinafter the case of a change from 100% to 400% will be described further.

As has been described with reference to FIG. 5, a delay amount of an image signal (RGB) is 16 lines when the magnification is 100%, whereas it is increased to 64 lines when the magnification is 400%. If, therefore, the timing of paper P supplied in the image forming process in step ST112 is the same as when the magnification is 100%, the printing of contents of the image signal generated in step ST108 starts at a distance of void width VW4* from the leading edge of the paper P, as shown in (g) of FIG. 7. This void width VW4* is greater than the void width VW1 at the magnification of 100% by 48 lines (corresponding to about 2 mm at the printing resolution of 600 dpi) (VW4*≠VW1).

Figure 9:
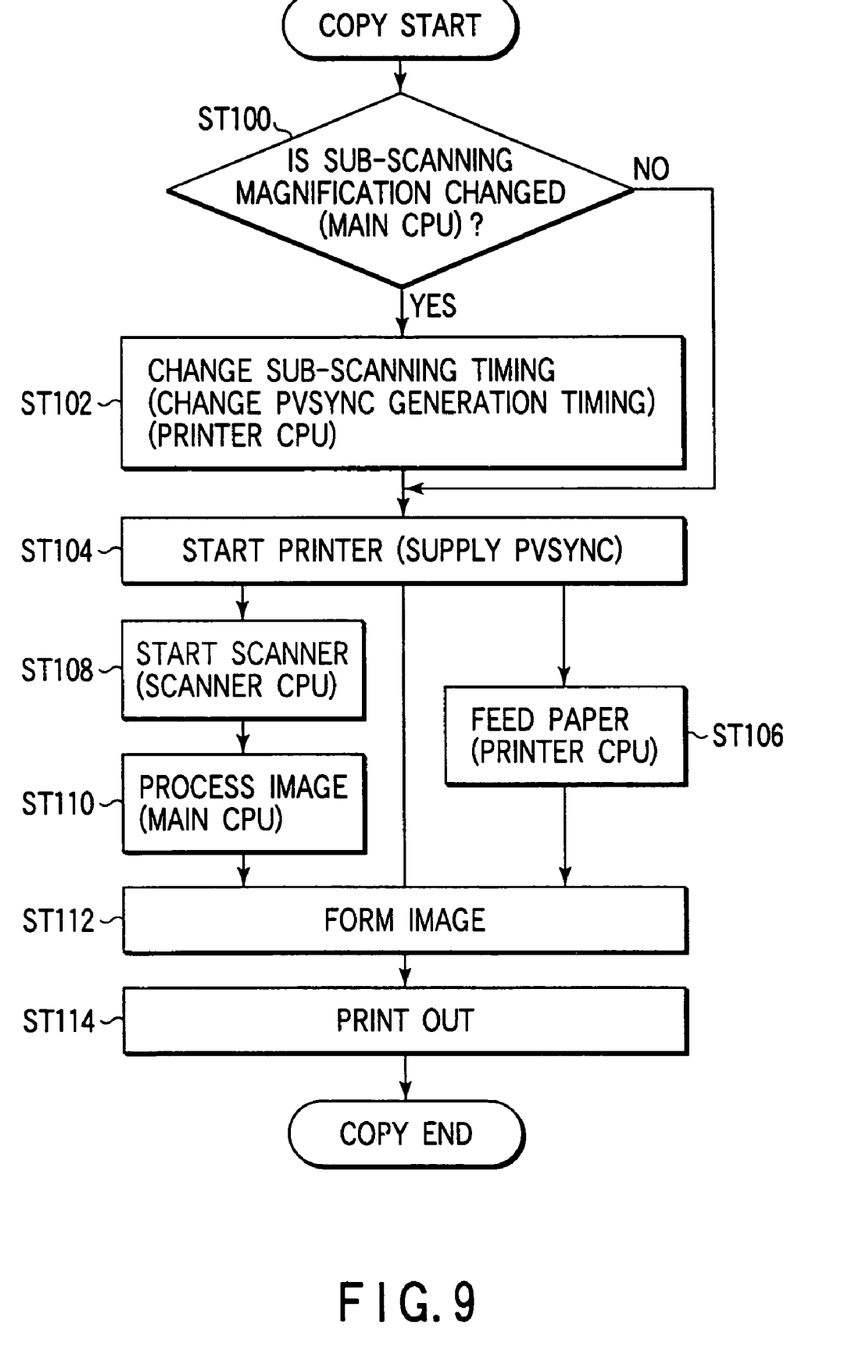
FIG. 9 is a flowchart explaining a process corresponding to the first method shown in FIG. 7.

According to the embodiment shown in FIGS. 5, 7 and 9, the PVSYNC-signal generation timing is quickened (by 48 lines) when the scanning magnification is 400% such that a void width VW4 between the leading edge of paper P and that of the content of the image signal becomes equal to the void width VW1 when the scanning magnification is 100% (cf. (f) in FIG. 7).

In other words, when the scanning magnification is changed to one higher (or lower) than 100%, the PVSYNC-signal generation timing is quickened (or delayed) in accordance with the change, and an amount of delay (corresponding to 48 lines at the magnification of 400%), which increases due to a change in magnification, is cancelled in the image-forming stage in step ST112. The amount of cancellation corresponds to an amount of image signal supply timing correction in (d) of FIG. 7.

In (d) to (f) of FIG. 7, an interval between the leading edge of the content of the image signal formed on paper P and that of the PVSYNC signal is represented as d400. According to the embodiment shown in FIGS. 5, 7 and 9, it can be said that the above interval is changed (from d100 to d400) by changing the PVSYNC-signal generation timing in order to fix the void width (VW1=VW4) irrespective of the scanning magnification (100%, 400%).

[3] The control system according to the second embodiment of the present invention will now be described with reference to FIGS. 6, 8 and 10.

Figure 6:
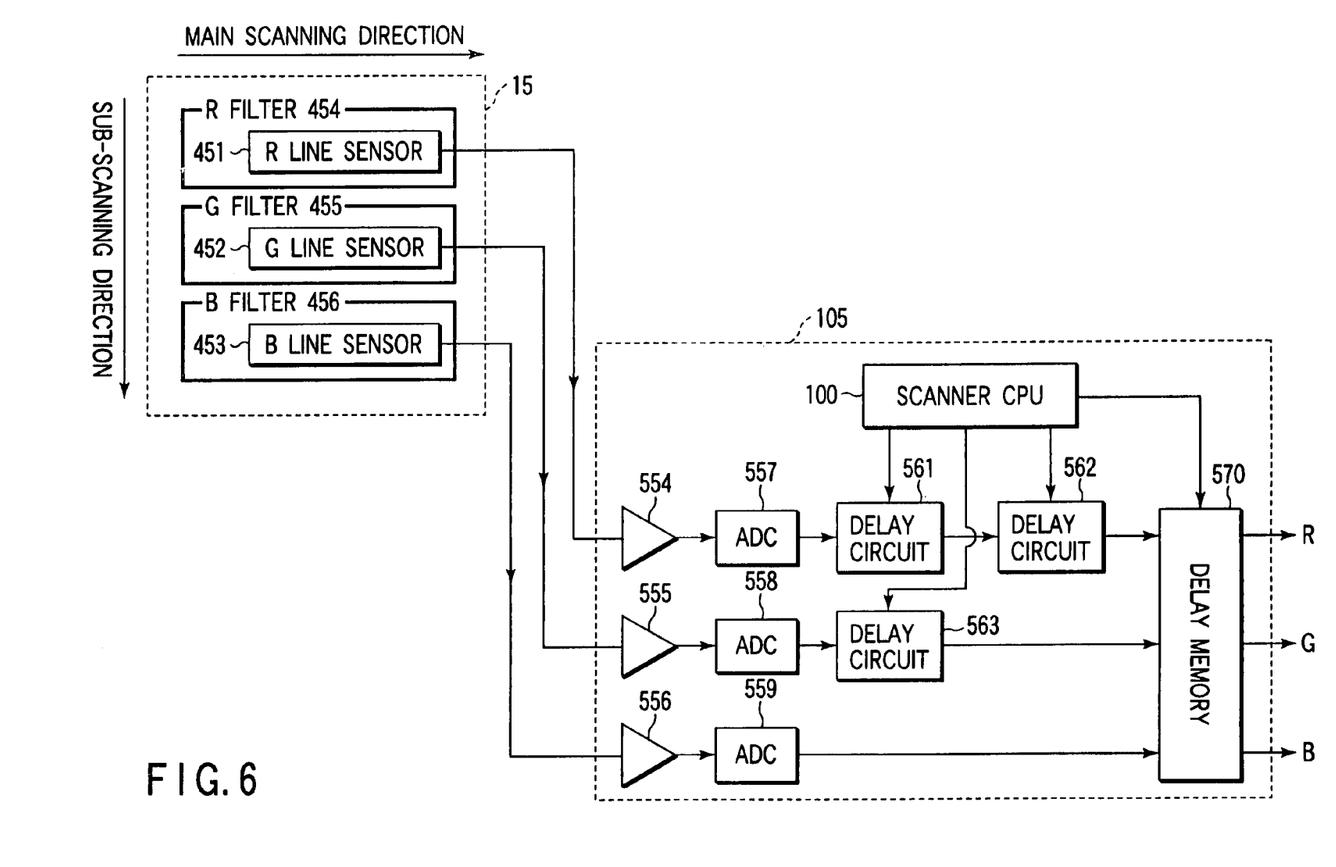
FIG. 6 is a diagram showing another example of the internal structures of the CCD sensor and the image correcting unit included in the scanner unit shown in FIG. 2.

FIG. 6 is a diagram showing an internal structure (example 2) of the CCD sensor and the image correcting section included in the scanner unit illustrated in FIG. 2. The circuit arrangement of FIG. 6 differs from that of FIG. 5 in that a delay memory 570 is arranged in the final stage. The elements common to the circuit arrangements shown in FIGS. 5 and 6 have the same functions, operations and features.

A characteristic portion of the circuit arrangement of FIG. 6 (that the circuit arrangement of FIG. 5 does not have) will be discussed hereinafter.

According to the embodiment shown in FIG. 6, when the scanning magnification is 400%, an image delay of 48 lines is required as described above with reference to FIG. 5. It is the delay memory 570 that causes the 48-line delay. A delay amount of 64 lines, which is equal to the sum of that of 48 lines in the delay memory 570 and that of 16 (=8×2) lines in the delay circuits 561 and 562, is output from the image correcting section 105 in FIG. 5 when the scanning magnification is 400%. If the delay amount of 64 lines can be obtained at the 400% scanning magnification, the writing of image to paper in the sub-scanning direction can be started at the same timing as when a delay amount of 16 lines is obtained at the scanning magnification of 100% (in combination with a change in paper feed timing described later).

According to the arrangement illustrated in FIG. 6, no delay is caused by the delay memory 570 when the magnification is 100% but a delay of 48 lines is done by the delay memory 570 when the magnification is 400%. It is thus possible to counter a problem that the starting position (corresponding to the void width) in which an image for printing is written to paper in the sub-scanning direction is varied with the scanning magnification.

In other words, the arrangement of FIG. 6 is allowed to deal with variations in write start position (corresponding to the void width) in the sub-scanning direction due to a change in scanning magnification if an amount of delay in the delay memory 570 is changed appropriately without any timing control of PVSYNC signals (without changing the PVSYNC-signal generation timing in accordance with the scanning magnification) unlike in the case of FIG. 5.

Figure 8:
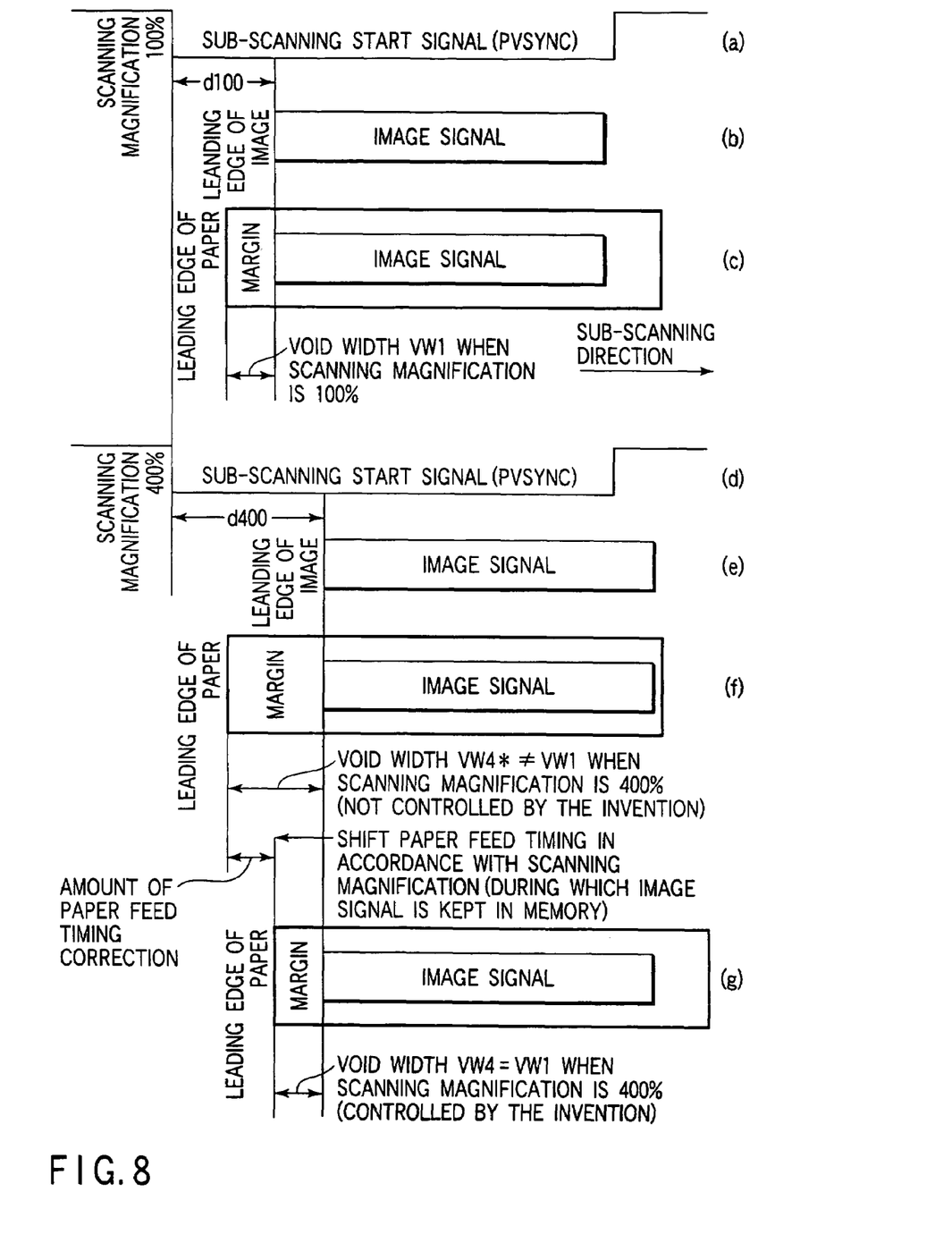
FIG. 8 is a schematic diagram explaining a second method of fixing a margin (void width) between the leading edge of paper and that of an image formed on the paper, irrespective of the image scanning magnification of a scanner.

As a second means for resolving the above problem of "variations in void width with scanning magnification (print magnification)," the main CPU 31 constitutes the following means (3) in association with the scanner CPU 100 and the printer CPU 110:

(3) Timing control means for controlling (cf. (f) and (g) in FIG. 8) feed timing of paper P to the image forming sections (10y, 10m, 10c, 10k and 50 in FIG. 1) from a paper feed mechanism (for feeding paper P from 22 to 26 in FIG. 1) such that the void width is fixed irrespective of the scanning magnification (cf. (g) in FIG. 8).

A time period by which paper feed is delayed corresponds to a delay in the delay memory 570.

The mechanism for fixing the void width irrespective of the scanning magnification will be described later with reference to FIG. 8, and the control process for doing the same will also be described with reference to FIG. 10.

FIG. 8 is a schematic diagram explaining a second method of fixing a margin (void width) between the leading edge of paper and that of an image formed on the paper, irrespective of the image scanning magnification of a scanner, when the structure shown in FIG. 6 is applied to those shown in FIGS. 1 to 4. FIG. 10 is a flowchart explaining a process corresponding to the second method shown in FIG. 8.

Figure 10:
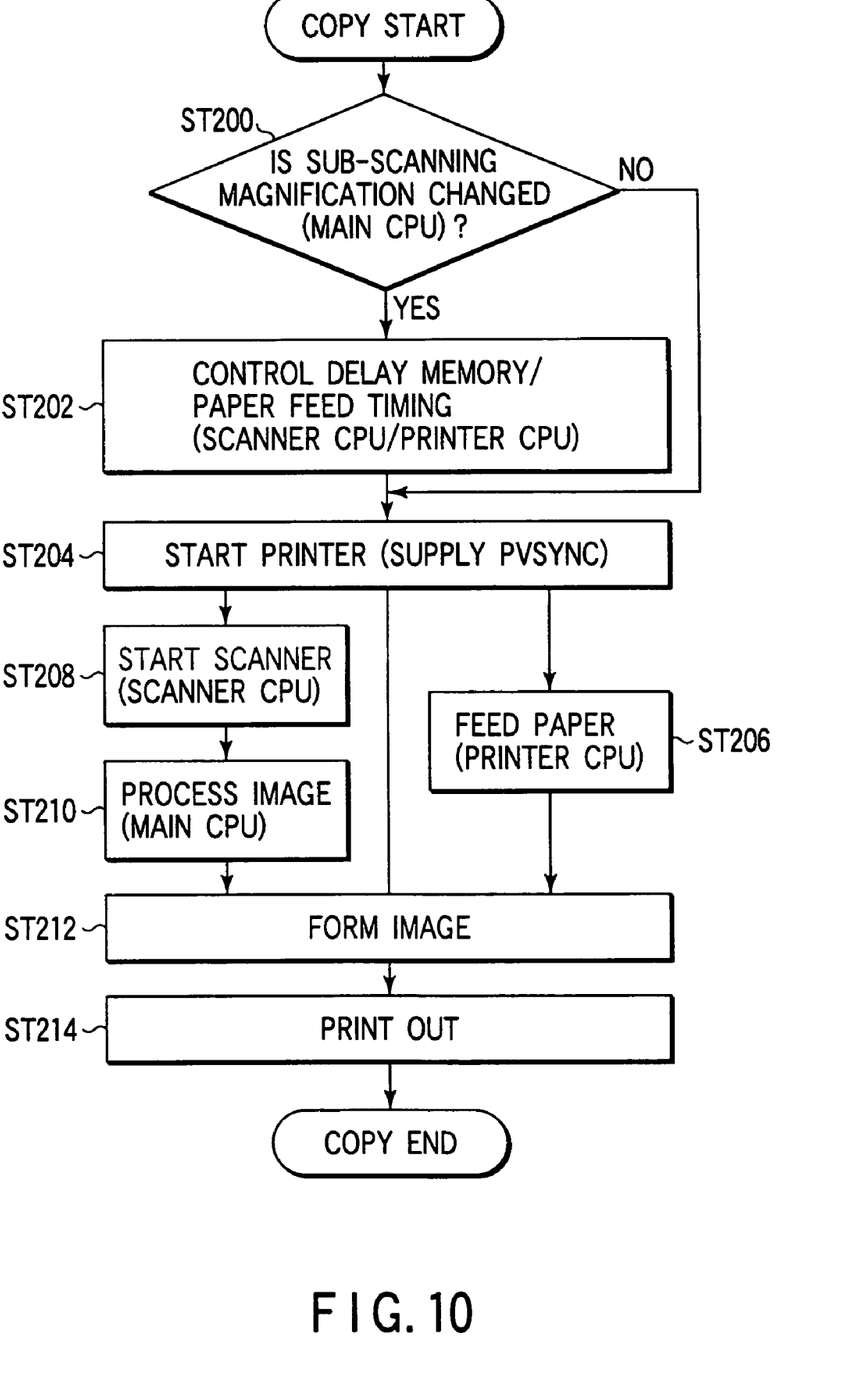
FIG. 10 is a flowchart explaining a process corresponding to the second method shown in FIG. 8.

When the scanning magnification is 100% (default setting), the image forming states (a) to (c) in FIG. 8 are the same as those in (a) to (c) in FIG. 7 and the image forming operations steps ST200 and ST204 to ST214 in FIG. 10 are the same as those of steps ST100 and ST104 to ST114 in FIG. 9 (an amount of delay in the delay memory 570 is set to zero).

The control of fixing the void width at VW1 of 100% scanning magnification shown in (c) in FIG. 8, irrespective of the scanning magnification, can be performed as follows.

When a user designates the scanning magnification of 400% from the condition setting key 43 shown in FIG. 2 and depresses the print key 42, the scanning magnification is changed from 100% to 400% (YES in step ST200) and thus the delay amount of the delay memory is changed to that of 48 lines by the scanner CPU 100 (step ST202).

In step ST202, the printer CPU110 delays the paper feed timing by 48 lines. If the paper feed timing of paper P supplied in the image forming process in step ST212 is the same as when the magnification is 100%, it is quickened by 48 lines, and the printing of contents of the image signal generated in step ST208 starts at a distance of void width VW4* from the leading edge of the paper, as shown in (f) of FIG. 8. This void width VW4* is greater than the void width VW1 ((c) in FIG. 8) at the magnification of 100% by 48 lines (corresponding to about 2 mm at the printing resolution of 600 dpi) (VW4*≠VW1).

According to the embodiment shown in FIGS. 6, 8 and 10, when the scanning magnification is 400%, the paper feed timing is delayed by 48 lines such that a void width VW4 between the leading edge of paper P and that of the content of the image signal becomes equal to the void with VW1 when the scanning magnification is 100% ((g) in FIG. 8).

In other words, when the scanning magnification is changed to one higher than 100%, the paper feed timing is delayed in accordance with the change, and an amount of delay (corresponding to 48 lines at the magnification of 400%), which increases due to a change in magnification, is cancelled in the image-forming stage in step ST212. The amount of cancellation corresponds to an amount of paper feed timing correction in (f) and (g) of FIG. 8.

According to the embodiment shown in FIGS. 6, 8 and 10, in order to fix the void width (VW1=VW4) irrespective the scanning magnification (100%, 400%), an image delay amount (an amount of delay in the delay memory 570) is determined in accordance with a change in magnification, and the paper feed timing is delayed based on the determined image delay amount. Thus, the margin (void width) between the leading edge of paper P and that of a copying image obtained by print-out in step ST214 and formed on the paper P is fixed irrespective of the scanning magnifications.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For instance, the control described with reference to FIG. 7 (the PVSYNC generation/supply timing is changed with the scanning magnification, and the paper feed timing is not changed) and the control described with reference to FIG. 8 (the paper feed timing is changed with the scanning magnification, and the PVSYNC generation/supply timing is not changed) can be executed alone or in combination with each other.

When the above controls shown in FIGS. 7 and 8 are combined with each other, the relative timing between the image signal supply timing and the paper feed timing can be changed with the scanning magnification.

Needless to say, not only the controls shown in FIGS. 7 and 8 are combined with each other in accordance with the structures of the individual image forming apparatuses (in this case the above-mentioned relative timing control), but also they can be executed selectively.

What is claimed is:

1. An image forming apparatus comprising:
   image reading means for reading a document image to generate an image signal;
   image forming means for forming a copying image corresponding to the image signal supplied from the image reading means, on an image receiving medium;
   feeding means for feeding the image receiving medium to the image forming means;
   magnification setting means for setting a reading magnification when the document image is read by the image reading means; and
   timing control means for controlling timing of supply of the image signal from the image reading means to the image forming means and timing of feed of the image receiving medium from the feeding means to the image forming means such that a size of a margin between a leading edge of the image receiving medium and that of the copying image formed on the image receiving medium is fixed irrespective of the reading magnification.

2. An image forming apparatus comprising:
   image reading means for reading a document image to generate an image signal;
   image forming means for forming a copying image corresponding to the image signal supplied from the image reading means, on an image receiving medium;
   feeding means for feeding the image receiving medium to the image forming means;
   magnification setting means for setting a reading magnification when the document image is read by the image reading means; and
   timing control means for controlling timing of supply of the image signal from the image reading means to the image forming means such that a size of a margin between a leading edge of the image receiving medium and that of the copying image formed on the image receiving medium is fixed irrespective of the reading magnification.

3. An image forming system comprising a scanner for scanning an image of a document to output an image signal and a printer for copying the image onto an image receiving medium in response to the image signal, wherein:
   the system comprises scanning magnification setting means for setting a scanning magnification when the scanner scans the document;
   the scanner includes an image sensor for outputting a signal generated by optically scanning the document in a main scanning direction and a sub-scanning direction perpendicular to the main scanning direction;
   the printer includes sub-scanning start signal generation means for generating a sub-scanning start signal for causing the scanner to start scanning the document in the sub-scanning direction; and
   the system is configured so as to change timing at which the sub-scanning start signal generation means generates the sub-scanning start signal in accordance with the scanning magnification set by the scanning magnification setting means, wherein the timing is changed such that a size of a margin between a leading edge of the image receiving medium and that of the image copied onto the image receiving medium is fixed irrespective of the scanning magnification.

4. An image forming method using a system including a scanner for scanning an image of a document to output an image signal, a printer for copying the image onto an image receiving medium in response to the image signal, and scanning magnification setting means for setting a scanning magnification when the scanner scans the document, the scanner including an image sensor for outputting a signal generated by optically scanning the document in a main scanning direction and a sub-scanning direction perpendicular to the main scanning direction, and the printer including sub-scanning start signal generation means for generating a sub-scanning start signal for causing the scanner to start scanning the document in the sub-scanning direction, the method comprising:
   checking whether the scanning magnification is changed; and
   varying timing at which the sub-scanning start signal is generated in accordance with the scanning magnification changed by the scanning magnification setting means, wherein the timing is changed such that a size of a margin between a leading edge of the image receiving medium and that of the image copied onto the image receiving medium is fixed irrespective of a change in the scanning magnification.

5. An image forming apparatus comprising:
an image reading module configured to read a document image to generate an image signal;
an image forming module configured to form a copying image corresponding to the image signal supplied from the image reading module, on an image receiving medium;
a feeding module configured to feed the image receiving medium to the image forming module;
a magnification setting module configured to set a reading magnification when the document image is read by the image reading module; and
a timing control module configured to control timing of supply of the image signal from the image reading module to the image forming module and timing of feed of the image receiving medium from the feeding module to the image forming module such that a size of a margin between a leading edge of the image receiving medium and that of the copying image formed on the image receiving medium is fixed irrespective of the reading magnification.

6. An image forming apparatus comprising:
an image reading module configured to read a document image to generate an image signal;
an image forming module configured to form a copying image corresponding to the image signal supplied from the image reading module, on an image receiving medium;
a feeding module configured to feed the image receiving medium to the image forming module;
a magnification setting module configured to set a reading magnification when the document image is read by the image reading module; and
a timing control module configured to control timing of supply of the image signal from the image reading module to the image forming module such that a size of a margin between a leading edge of the image receiving medium and that of the copying image formed on the image receiving medium is fixed irrespective of the reading magnification.

7. An image forming system comprising a scanner for scanning an image of a document to output an image signal and a printer for copying the image onto an image receiving medium in response to the image signal, wherein:
the system comprises a scanning magnification setting module configured to set a scanning magnification when the scanner scans the document;
the scanner includes an image sensor for outputting a signal generated by optically scanning the document in a main scanning direction and a sub-scanning direction perpendicular to the main scanning direction;
the printer includes a sub-scanning start signal generation module configured to generate a sub-scanning start signal for causing the scanner to start scanning the document in the sub-scanning direction; and
the system is configured so as to change timing at which the sub-scanning start signal generation module generates the sub-scanning start signal in accordance with the scanning magnification set by the scanning magnification setting module, wherein the timing is changed such that a size of a margin between a leading edge of the image receiving medium and that of the image copied onto the image receiving medium is fixed irrespective of the scanning magnification.

8. An image forming method using a system including a scanner for scanning an image of a document to output an image signal, a printer for copying the image onto an image receiving medium in response to the image signal, and a scanning magnification setter for setting a scanning magnification when the scanner scans the document, the scanner including an image sensor for outputting a signal generated by optically scanning the document in a main scanning direction and a sub-scanning direction perpendicular to the main scanning direction, and the printer including a sub-scanning start signal generator for generating a sub-scanning start signal for causing the scanner to start scanning the document in the sub-scanning direction, the method comprising:
checking whether the scanning magnification is changed; and
varying timing at which the sub-scanning start signal is generated in accordance with the scanning magnification changed by the scanning magnification setter, wherein the timing is changed such that a size of a margin between a leading edge of the image receiving medium and that of the image copied onto the image receiving medium is fixed irrespective of a change in the scanning magnification.

9. An image forming method comprising:
reading a document image to generate an image signal;
feeding an image receiving medium to form a copying image corresponding to the image signal on the image receiving medium;
setting a reading magnification when the document image is read; and
controlling timing of supply of the image signal and timing of feed of the image receiving medium such that a size of a margin between a leading edge of the image receiving medium and that of the copying image formed on the image receiving medium is fixed irrespective of the reading magnification.

\* \* \* \* \*